United States Patent
Conrads et al.

(10) Patent No.: US 10,697,813 B2
(45) Date of Patent: Jun. 30, 2020

(54) MICROWAVE MEASURING ARRANGEMENT FOR DETERMINING THE LOADING OF A TWO-PHASE FLOW

(71) Applicant: PROMECON process measurement control GmbH, Barleben (DE)

(72) Inventors: Hans Georg Conrads, Hannover (DE); Christian Dippner, I, Magdeburg (DE); Theodoros Tsifotidis, Berlin (DE)

(73) Assignee: PROMECON process measurement control GmbH, Barleben (DE)

( * ) Notice: Subject to any disclaimer, the term of this patent is extended or adjusted under 35 U.S.C. 154(b) by 0 days.

(21) Appl. No.: 16/346,629

(22) PCT Filed: Oct. 27, 2017

(86) PCT No.: PCT/DE2017/000362
§ 371 (c)(1),
(2) Date: May 1, 2019

(87) PCT Pub. No.: WO2018/082726
PCT Pub. Date: May 11, 2018

(65) Prior Publication Data
US 2020/0064167 A1    Feb. 27, 2020

(30) Foreign Application Priority Data

Nov. 4, 2016   (DE) .......................... 10 2016 013 220

(51) Int. Cl.
*G01F 1/66*     (2006.01)
*G01F 1/74*     (2006.01)
(Continued)

(52) U.S. Cl.
CPC ................ *G01F 1/662* (2013.01); *G01F 1/74* (2013.01)

(58) Field of Classification Search
CPC .. G01F 1/66; G01F 1/74; G01F 23/00; G01N 22/00
See application file for complete search history.

(56) References Cited

U.S. PATENT DOCUMENTS 5,351,521 A * 10/1994 Cracknell .............. G01N 22/00
                                                    73/19.1
5,864,239 A    1/1999 Adams et al.
(Continued)

FOREIGN PATENT DOCUMENTS

DE       3317215 A1    11/1983
DE       4426280 A1    2/1996
(Continued)

OTHER PUBLICATIONS

International Search Report of PCT/DE2017/000362, dated Mar. 3, 2018.

*Primary Examiner* — Jewel V Dowtin
(74) *Attorney, Agent, or Firm* — Cohen & Hildebrand, PLLC

(57) ABSTRACT

Microwave measuring arrangement for determining loading two-phase flow with gaseous carrier medium in tube of channel system (1) with small solid and/or liquid particles. Microwaves with frequencies between 0.95 and 1.05 times the frequency of waveguide fundamental wave, are coupled into an electrically conductive section of the tube/channel system (1), section being delimited by filed rods (4,4') and acting as resonator, the shift in the resonant frequency of the resonator on account of loading of the medium with solid and/or liquid particles is determined. To suppress interference (reflected, diffracted and/or superimposed) in the tube/or channel system (1), two auxiliary field rods (6, 7 and 6', 7') assigned to each filed rod (4,4') are provided, Auxiliary filed rods (6, 7 and 6', 7) are arranged at an angle α with
(Continued)

respect to the field rod (4, 4') of α=+45°±10 and/or α=−45°±10° and/or α=+135°±10° and/or α=−135°±.

6 Claims, 3 Drawing Sheets

(51) Int. Cl.
*G01N 22/00* (2006.01)
*G01F 1/50* (2006.01)

(56) References Cited

U.S. PATENT DOCUMENTS

| | | |
|---|---|---|
| 6,771,080 B2 | 8/2004 | Conrads et al. |
| 7,343,818 B2 * | 3/2008 | Gysling ................. G01F 1/704 |
| | | 73/861.18 |
| 9,146,197 B2 | 9/2015 | Hu |
| 9,605,987 B2 * | 3/2017 | Wee ........................ G01F 1/50 |
| 2007/0055464 A1 * | 3/2007 | Gysling ................. G01F 1/666 |
| | | 702/50 |
| 2020/0064167 A1 * | 2/2020 | Conrads ................... G01F 1/74 |

FOREIGN PATENT DOCUMENTS

| | | |
|---|---|---|
| DE | 19650112 C1 | 5/1998 |
| DE | 10164107 C1 | 9/2003 |
| GB | 2468754 A | 9/2010 |
| WO | 9105243 A1 | 4/1991 |
| WO | 03056316 A1 | 7/2003 |

* cited by examiner

MICROWAVE MEASURING ARRANGEMENT FOR DETERMINING THE LOADING OF A TWO-PHASE FLOW

This is an application filed under 35 USC § 371 of PCT/DE2017/000362, filed on Oct. 27, 2017, claiming priority to DE 10 2016 013220.5, filed on Nov. 4, 2016, each of which is herein incorporated by reference in its entirety.

BACKGROUND OF THE INVENTION

(1) Field of the Invention

The invention relates to a microwave measuring arrangement for determining the loading of a two-phase flow with gaseous carrier medium in a tube or channel system with small and very small solid and/or liquid particles. A preferred field of application of the invention is the determination of the loading of a gas flow with solid particles in large-volume pneumatic solids transport systems, for example, the loading of an air flow with pulverized coal in a tube or channel system of a coal-fired power plant.

(2) Description of Related Art

It is known to determine the particle loading of a two-phase flow with gaseous carrier medium in a tube or channel system by means of microwaves. For this purpose, in a considerable number of the known solutions, microwaves of a predetermined frequency or a predetermined frequency range are coupled into an electrically conductive section of the tube or channel system prepared as a measuring section, and a change of parameters of the microwaves, for example the frequency, is evaluated at the end of the measuring section. Preferably, the frequency of the waveguide fundamental wave or a frequency range around the waveguide fundamental wave is hereby used in order to avoid unnecessarily complicating the evaluation and/or to minimize interference. The predetermined frequency or the predetermined frequency range of the coupled microwave thus depends on the geometric dimensions of the measuring section.

The measurement is based on the physical principle that the dielectric constant of the gaseous carrier medium loaded with solid particles depends on the quantity of solid particles entrained in the gaseous carrier medium and that the microwaves experience, depending on the dielectric constant of the medium in which they propagate, a change in their parameters, e.g. their resonance frequency, their amplitude, and their phase.

For example, DE 44 26280 A1 discloses a method for determining the loading of a gas flow with solids, in particular for controlling the firing of a boiler with pulverized coal in a coal-fired power plant, wherein the solid content in the gas flow is inferred from the absorption of electromagnetic waves along a measuring section carrying the gas flow.

DE 33 17 215 A1 discloses a method for the quantitative determination of sample particles, wherein the sample particles are introduced into the electromagnetic field generated by a microwave generator, wherein at least the change of a parameter of the electromagnetic field is measured and the quantity of sample particles is inferred from the measured change.

The aforedescribed solutions have found only scant practical applications due to a high susceptibility to interference combined with low measurement accuracy. The high susceptibility to interference and the low measurement accuracy are caused by interferences originating from microwaves that are reflected in the tube or channel system and penetrate into the measuring section. Particularly with small loads, the coupled microwaves are conducted in the tube or channel system like in a waveguide over long distances and reflected and/or diffracted at constrictions, branches, bends or ends. Waves running back and forth are thereby superimposed, thus resulting in difficult to evaluate measurement signals or significant distortion of the measurement results.

To avoid such interferences, solutions have been developed that employ microwave resonators with specific geometry. For example, EP 0 669 522 A2 describes a device and a method for measuring a powder mass flow in a powder-gas mixture, wherein a microwave resonator is attached at the outside of a delivery line or surrounds the transport line as a cavity resonator. When the cavity resonator is attached to the delivery line from the outside, the measurement is carried out only in a partial flow of the powder-gas mixture. When, as is usually the case with large-volume delivery lines, different particle loadings of the powder-gas mixture occur over the cross-section of the delivery line, and strands of increased particle concentration can to some extent be expected, the measurements made only in a partial flow of the powder-gas mixture may be severely flawed. Such measurement errors are prevented with a cavity surrounding the transport line. However, corresponding resonators are associated with considerable structural complexity, which may also necessitate an intervention in the transport line itself, and are therefore not practically feasible in large-volume delivery lines due to limited space. The described solution is therefore limited to applications having only comparatively low flow rates, such as in powder coating equipment.

U.S. Pat. No. 5,351,521 A describes a device for determining the proportions of gas and water contained in oil. For this purpose, tube sections with consecutively stepped decreasing diameter that transition into one another are arranged inside the transport tube carrying the oil-gas-water mixture. Measuring electrodes are arranged in the tube sections which can be used to measure and evaluate according to the decreasing diameter of the tube sections different limit frequencies and thus different frequency ranges of injected microwaves. The tube sections are held by electrically conductive rods that extend radially from the outer wall of each tube section to the inner wall of the delivery tube. This arrangement is intended to prevent the coupled microwaves from passing through the space between the inner wall of the transport tube and the outer wall of the tube sections. The described measuring arrangement is characterized by a comparatively large measuring range. Disadvantageously, the installation of tube sections in the delivery tube is complex and the flow conditions inside the transport tube are significantly affected.

Finally, DE 101 64 107 C1 discloses a microwave measuring arrangement for determining the loading of a two-phase flow with gaseous carrier medium with small and very small solid and/or liquid particles, wherein an electrically conductive rod, referred to as field rod, is introduced into a section of the tube or channel system composed of an electrically conductive material in the longitudinal direction, before and after the measuring section, which is formed in a known manner by a transmitting antenna for coupling microwaves in the tube or channel system and a receiving antenna for receiving microwaves having changed parameters along the measuring section, such as resonance frequency, amplitude and/or phase, so that the section of the tube or channel system delimited by the field rods acts, in conjunction with the field rods, as a resonator for the coupled microwaves. The distance between the field rods and thus the section of the tube or channel system delimited by the field rods determines the resonant frequency of the resonator. The distance is selected so as to correspond to the wavelength of the fundamental waveguide wavelength of the section of the tube or channel system composed of the electrically conductive material.

The field rods are located approximately in the plane of polarization of the coupled microwaves and within the respective cross-sectional area of the electrically conductive section of the tube or channel system, projecting radially at least to the center of the cross-sectional area. The arrangement of the field rods is intended to short microwaves that are changed outside the measuring section in the tube or channel system by reflection, diffraction and/or superposition, which can falsify the measurement results, thereby preventing the microwaves from entering the measuring section.

In a preferred embodiment of the microwave measuring arrangement, auxiliary field rods are arranged outside the resonator parallel to the field rods in the direction of the field rods or in the opposite direction at a distance of about one-eighth of the wavelength of the resonant frequency of the resonator, which is formed by the field rods and the portion of the tube or channel system delimited by the field rods. The arrangement of the auxiliary field rods is intended to counteract alteration of the measurement results by microwaves in the tube or channel system whose polarization plane and/or phase position are changed by reflection, diffraction and/or superimposition and whose electric field strength at the location of the field rods is zero, by shorting the microwaves outside the resonator and thereby preventing them from entering the measuring section.

It has been shown that in a practical application of the microwave measuring arrangement described in DE 101 64 107 C1 in large volume tube or channel systems of coal-fired power plants for determining the loading of an air flow with pulverized coal to achieve sufficiently good measurement results, on the one hand, the distance of the field rods should be chosen so that it is about twice the wavelength of the waveguide fundamental wave of the tube or channel system composed of the electrically conductive material portion and, on the other hand, the arrangement of auxiliary field rods is necessary in most situations. However, this has the disadvantage that a comparatively long straight electrically conductive tube or channel section with constant cross-sectional geometry is required for the installation of such a microwave measuring arrangement in an existing large-volume tube or channel system. Such comparatively long straight electrically conductive tube or channel sections with constant cross-sectional geometry are often not available in already existing tube or channel systems.

Starting from the described prior art, it is the object of the invention to provide a microwave measuring arrangement for determining in a tube or channel system the loading of a two-phase flow with a gaseous carrier medium with small and very small solid and/or liquid particles, which requires for a highly accurate installation in an existing tube or tube channel system only a comparatively short straight electrically conductive tube or channel section with constant cross-sectional geometry.

The object of the invention is achieved by a microwave measuring arrangement with the features of claim 1. Advantageous embodiments of the invention are recited in claims 2 to 6.

BRIEF SUMMARY OF THE INVENTION

A microwave measuring arrangement according to the invention for determining the loading of a two-phase flow with a gaseous carrier medium in a tube or channel system with small and very small solid and/or liquid particles has a transmitting antenna and a receiving antenna which are arranged spaced from each other and with a constant cross-sectional geometry in the longitudinal direction of a straight electrically conductive section of the tube or channel system which carries the two-phase flow and thus form a measuring section in a known manner. The transmitting antenna is used to couple linearly polarized microwaves. The microwave measuring arrangement furthermore has two electrically conductive rods, referred to hereinafter as field rods, which are arranged in the longitudinal direction of the straight electrically conductive section of the tube or channel system having constant cross-sectional geometry before and after the measuring section and in alignment with the measuring section, inside a specific cross-sectional area of the straight electrically conductive section of the tube or channel system, extending into the interior of the straight electrically conductive section of the tube or channel system with constant cross-sectional geometry, so that the field rods and the straight electrically conductive section of the tube or channel system with the constant cross-sectional geometry between the field rods operate as a resonator for the linearly polarized microwaves coupled via the transmitting antenna.

For this purpose, the mutual distance between the field rods in the longitudinal direction of the straight electrically conductive section of the tube or channel system is in a range between approximately one time and approximately twice the wavelength of the waveguide fundamental wave of the straight electrically conductive section of the tube or channel system with the constant cross-sectional geometry.

As a characteristic feature of the invention, two electrically conductive rods, hereinafter called auxiliary field rods, are arranged at an angle to the field rod of +45°±10° and/or −45°±10° and/or +135°±10° and/or −135°±10° and associated with each field rod in the cross-sectional area of the straight electrically conductive section of the tube or channel system in which the field rod extends, or in a cross-sectional area closely spaced from the cross-sectional area in which the field rod extends, compared to the wavelength of the waveguide fundamental wave of the straight electrically conductive section of the tube or channel system with constant cross-sectional geometry, wherein the two auxiliary field rods assigned to a field rod enclose an angle of 90°±20°. These auxiliary field rods are here electrically conductively connected to the straight electrically conductive section of the tube or channel system and are formed to extend radially from the inner wall of the straight electrically conductive section of tube or channel system at least to the center of the cross-sectional area, and are arranged in alignment with each other in the longitudinal direction of the straight electrically conductive section the tube or channel system.

In order for the field rods and the straight electrically conductive section of the tube or channel system with constant cross-sectional geometry between the field rods to act as resonator for microwaves with the frequency of the waveguide fundamental wave of the straight electrically conductive section of the tube or channel system with constant cross-sectional geometry, the field rods are preferably electrically connected to the straight electrically conductive section of the tube or channel system in the straight electrically conductive section of the tube or channel system with constant cross-sectional geometry. The field rods are further aligned approximately in the polarization plane of the coupled linearly polarized microwaves and in the longitudinal direction of the straight electrically conductive section of the tube or channel system with respect to the transmitting and receiving antenna and formed to project radially from the inner wall of the straight electrically conductive section of the tube or channel system at least to the center of the cross-sectional area. Preferably, the distance of the field rods to the transmitting or receiving antenna is at least one tenth, more preferably at least half of the wavelength of the waveguide fundamental wave of the straight electrically conductive section of the tube or channel system with constant cross-sectional geometry.

The straight electrically conductive section of the tube or channel system with the constant cross-sectional geometry, which acts in conjunction with the field rods as a resonator, need not have a circular cross-section. The cross-sectional area of the delivery line section may also be oval, square, rectangular or polygonal. The center of the cross-sectional area is to be understood as the respective geometric center. The mean diameter is to be understood as the average distance between two opposite wall surface elements of the straight electrically conductive section of the tube or channel system with constant cross-sectional geometry. Preferably, for the measurement results to be unambiguous and for the achievable measurement accuracy, microwaves in a frequency range between 0.95 to 1.05 times the frequency of the waveguide fundamental wave should be coupled.

Starting from the preferred coupling of microwaves of a frequency range between 0.95 to 1.05 times the frequency of the waveguide fundamental wave to determine the loading of a two-phase flow with the microwave measuring arrangement according to the invention, the measuring section located between the transmitting and receiving antennas should have a length between the 0.8 to 3 times, preferably 1.5 times, the average diameter of the straight electrically conductive section of the tube or channel system having the constant cross-sectional geometry. The field rods are then to be arranged in the longitudinal direction of the straight electrically conductive section of the tube or channel system with a mutual distance from each other corresponding to approximately 3.5 times the average diameter of the straight electrically conductive section of the tube or channel system. The minimum distance of the field rods from the transmitting or receiving antenna corresponds to about 0.2 times the average diameter. The electrical system formed by the field rods and the straight electrically conductive section of the tube or channel system with the constant cross-sectional geometry then acts as a resonator for microwaves with the frequency of the waveguide fundamental wave.

The above arrangement of the field rods causes, on the one hand, the microwaves coupled via the transmitting antennas to be shorted or at least substantially attenuated so that they do not propagate at all or only imperceptible in the tube or channel system and, on the other hand, microwaves scattered into the tube or channel system and/or microwaves changed outside the measuring section through reflection, diffraction and superposition, which can cause distortion of the measurement results, are shorted or at least significantly attenuated and are thus prevented from entering the measuring section.

However, the effect of just the field rods is not sufficient to achieve sufficiently good or sufficiently accurate measurement results, because even with the arrangement of the field rods, distorting disturbances in the form of, for example, reflected microwaves with a frequency around the frequency of the waveguide fundamental wave are able to enter the measuring section. Extensive investigations have shown that distortions of the measurement results due to microwaves scattered into the tube or channel system or microwaves reflected, diffracted and/or superimposed in the tube or channel system and experiencing changes in their polarization plane and/or phase position and having frequencies around the frequency of the waveguide fundamental wave can be significantly reduced or prevented by using auxiliary field rods formed and arranged in accordance with the invention. Advantageously, with the arrangement of the auxiliary field rods according to the invention, the length of the straight electrically conductive tube or channel section with constant cross-sectional geometry required for the installation of a microwave measuring arrangement according to the invention need not be increased, meaning that only a straight electrically conductive tube or channel section with a constant cross-sectional geometry of sufficient length is required, as is necessary for the arrangement of the field rods to form a resonator composed of field rods and the straight electrically conductive section of the tube or channel system with constant cross-sectional geometry for microwaves having the frequency of the waveguide fundamental wave. This is of particular importance the microwave measuring arrangement is subsequently installed in an existing tube or channel system.

It has also been found that an inventive arrangement of auxiliary field rods causes a significant increase in the measurement accuracy of the microwave measurement arrangement. The signals received with the described measuring arrangement at the receiving antenna allow precise evaluation in a known manner by means of frequency measurement, so that a highly accurate determination of a shift in the resonant frequency of the resonator formed from the field rods and the straight electrically conductive section of the tube or channel system with the constant cross-section due to loading of the gaseous carrier medium with small and very small solid and/or liquid particles flowing in the resonator becomes possible. Starting from a calibration measurement with a predetermined loading of the gaseous carrier medium with small and very small solids and/or liquid particles, the observed shift of the resonance frequency is then a measure of the loading of the gaseous carrier medium with small and very small solid and/or liquid particles.

Due to the significant increase in measurement accuracy, when determining the loading of a two-phase flow with a microwave measuring arrangement according to the invention, the mutual distance between the field rods may also be selected to be smaller than the wavelength of the waveguide fundamental wave, if this is required by particular structural conditions of the tube or channel system in which the microwave measuring arrangement is to be installed. Satisfactory results in determining the loading of a two-phase flow have also been achieved with the microwave measuring arrangement according to the invention with a mutual distance between the field rods that is about 10% smaller than the wavelength or an integer multiple of the wavelength of the waveguide fundamental wave of the straight electrically conductive section of the tube- or channel system with constant cross-sectional geometry.

In a preferred arrangement of the auxiliary field rods, the distance between the two auxiliary field rods associated with a field rod and the field rod in the longitudinal direction of the straight electrically conductive section of the tube or channel system with constant cross-sectional geometry is at most of one tenth, preferably at most one thirtieth, of the wavelength of the waveguide fundamental wave of the straight electrically conductive section of the tube or channel system with constant cross-sectional geometry. In this case, the auxiliary field rods may be arranged spaced apart from the field rod in the longitudinal direction of the straight electrically conductive section either in the direction of the measuring section and in the opposite direction.

The auxiliary field rods are preferably formed and arranged such that they span at least half, preferably more than two-thirds, of the cross-sectional area of the straight electrically conductive section of the tube or channel system with constant cross-sectional geometry, thereby crossing the center of the cross-sectional area. Advantageously, the length of the auxiliary field rods corresponds to the length of the field rods.

The microwave measuring arrangement according to the invention advantageously has a simple and space-saving design, which makes it possible to integrate the measuring arrangement in an existing tube or channel system even with complex geometry and space conditions. The measurement results obtained with the microwave measuring arrangement according to the invention by evaluating the electrical signals sensed at the receiving antenna in a known manner by frequency measurement have surprisingly high precision compared to prior art solutions.

The microwave measuring arrangement according to the invention will now be explained in more detail with reference to an exemplary embodiment.

BRIEF DESCRIPTION OF THE DRAWINGS

The accompanying drawing shows schematically in

DETAILED DESCRIPTION OF THE INVENTION

Figure 1:
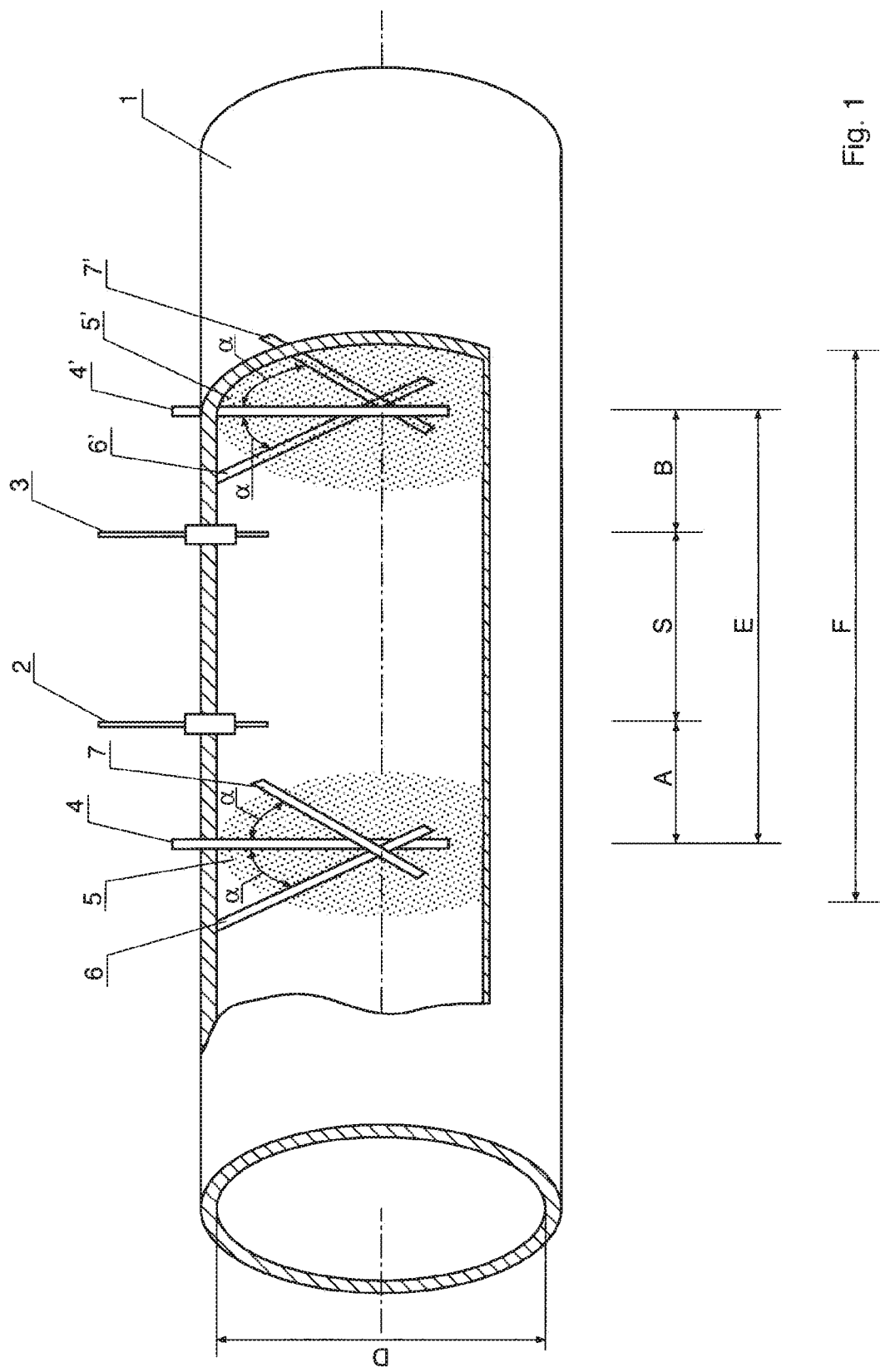
FIG. 1: an exploded electrically conductive section of a tube or channel system with a microwave measuring arrangement, in FIG. 2: a longitudinal section of the electrically conductive section of a tube or channel system with a microwave measuring arrangement, in FIG. 3: a cross section of the electrically conductive section of a tube or channel system with a microwave measuring arrangement, and in FIG. 4: by way of example, the relationship between the shift of the resonance frequency and the loading of the two-phase flow with pulverized coal.
Figure 2:
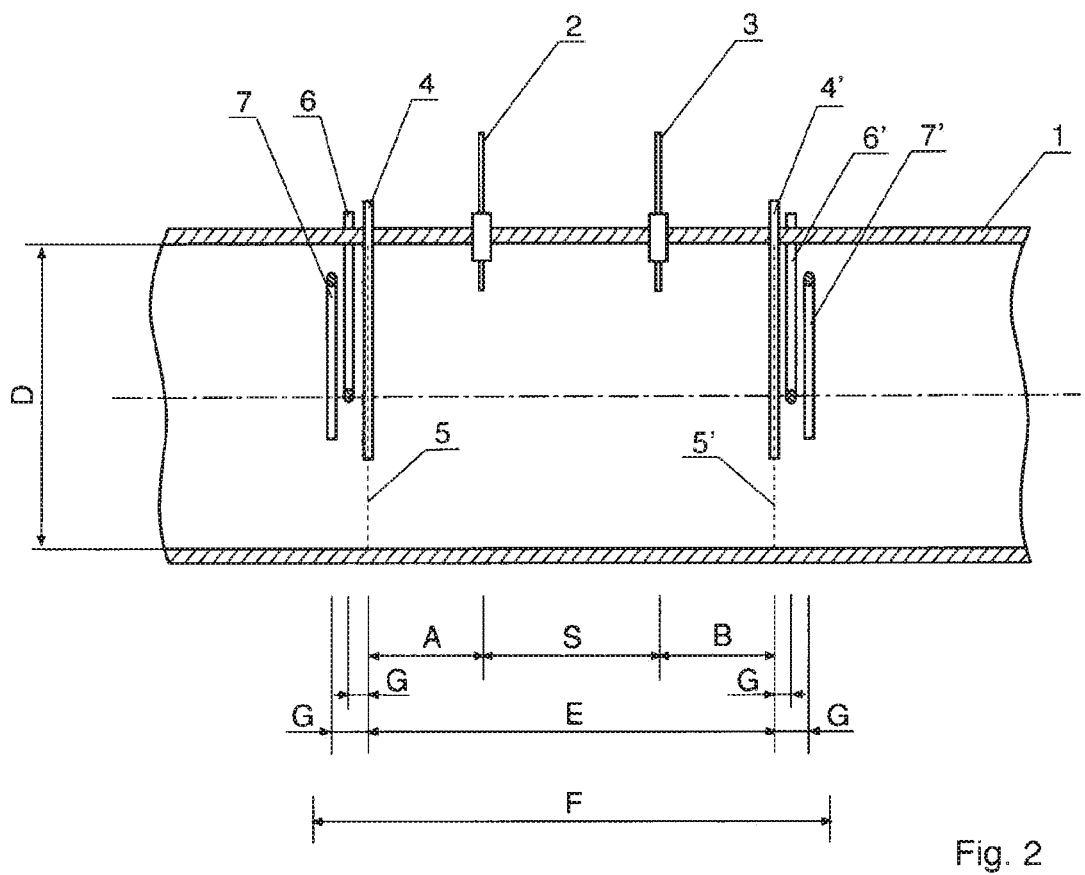
Figure 3:
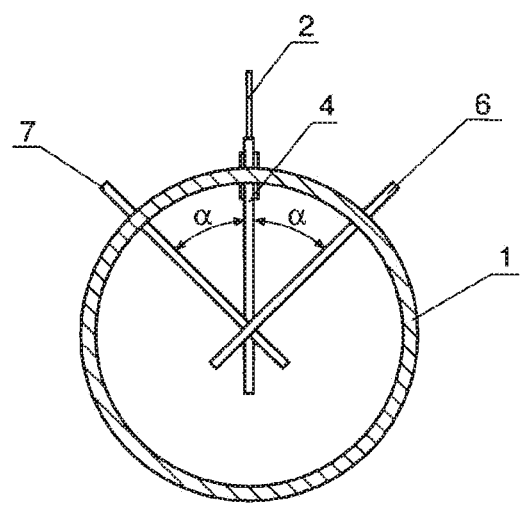

FIG. 1 shows a straight electrically conductive section F of a tube system 1 for pneumatic transport of pulverized coal, as employed in pulverized coal combustion plants of coal power plants. At least the wall of the section F of the tube system 1 is constructed of electrically conductive corrosion-resistant steel. The section F of the tube system 1 has an approximately round cross-sectional area with a diameter D=500 mm. The cross-sectional geometry of the section F of the tube system 1 is identical over the length of the section F. Projecting into the interior of the section F of the tube system 1 from the outside, a transmitting antenna 2 and a receiving antenna 3 are mounted consecutively in the longitudinal direction of the section F of the tube system 1 at a distance of 375 mm, forming a measuring section S. Microwaves with frequencies between 340 MHz to 352 MHz are coupled via the transmitting antenna 2. The frequency of the waveguide fundamental wave of the conductive section F of the tube system 1 is approx. 350.9 MHz, the wavelength of the waveguide fundamental wave is therefore approximately 850 mm. Field rods 4 and 4', which project radially into the interior of the straight electrically conductive section F of the tube system 1 and are located in the plane of polarization of the coupled microwaves, are arranged in the longitudinal direction of the straight electrically conductive section F of the tube system 1 in front of the transmitting antenna 2 and after the receiving antenna 3. The field rods 4 and 4' each extend within a cross-sectional area 5, 5' of the section F of the tube system 1. They are arranged at a mutual distance E of 1700 mm, which corresponds to twice the wavelength of the waveguide fundamental wave, and at the same distance A, B of 662.5 mm from the transmitting antenna 2 and the receiving antenna 3, respectively, and are aligned with each other and with the transmitting and receiving antenna 2, 3 in the longitudinal direction of the straight electrically conductive section F of the tube system 1. The field rods 4, 4' are constructed of abrasion-resistant round steel with a diameter of 4 mm and have a length of 330 mm. They thus extend beyond the center of the respective cross-sectional area 5, 5' and span about ⅔ of the respective cross-sectional area 5, 5'. Two auxiliary field rods 6, 7 and 6', 7', respectively, which are associated with each field rod 4, 4', are arranged at an angle α of ±45° parallel to the respective cross-sectional surfaces 5, 5', within which the field rods 4, 4' extend. Like the field rods 4, 4', the auxiliary field rods are constructed of abrasion-resistant round steel with a diameter of 4 mm and have a length of 330 mm. The auxiliary field rods 6, 7 and 6', 7' are arranged in the longitudinal direction of the section F of the tube system 1 and in alignment with each other. They have in the longitudinal direction of the section F of the tube system 1 a maximum distance G of 28 mm from the respective field rod 4, 4' with which they are associated, wherein the auxiliary field rods 6 and 6' have a distance G of 12 mm from the respective field rod 4, 4' in the longitudinal direction of the section F of the tube system 1, with the distance G of the auxiliary field rods 7 and 7' from the respective field rod 4, 4' being 24 mm. Both the field rods 4, 4' and the auxiliary field rods 6, 7 and 6', 7' are mechanically affixed by screws to the wall of the section F of the tube system 1 and electrically connected thereto. The wall of the section F of the tube system 1 and the field rods 4, 4' as well as the auxiliary field rods 6, 7 and 6', 7' have the same electrical potential. FIGS. 2 and 3 illustrate the described structural features.

The system composed of the field rods 4, 4' and the electrically conductive section F of the tube system 1 formed by the above-described arrangement of the field rods 4, 4' in the straight electrically conductive section F of the tube system 1 acts as resonator for linearly polarized microwaves having the frequency of the waveguide fundamental wave. Linearly polarized microwaves with the frequency of the waveguide fundamental wave coupled via the transmitting antenna 2 into the straight electrically conductive Section F of the tube system 1 are shorted by the field rods 4, 4' or at least significantly attenuated. This has the effect that the linearly polarized microwaves coupled via the transmitting antenna 2 propagate not at all or only insignificantly outside the section in the tube system 1 delimited by the field rods 4, 4'. The arrangement of the field rods 4, 4' further causes microwaves scattered into the tube system 1 and having approximately the frequency of the waveguide fundamental wave and approximately a polarization that corresponds to the microwaves coupled via the transmitting antenna 2 and/or microwaves modified outside the section F of the tube system 1 by reflection, diffraction and superposition, and having the frequency of the waveguide fundamental wave and approximately a polarization that corresponds to the microwaves coupled via the transmitting antenna 2, which can distort the results, to be shorted or at least significantly attenuated, thus preventing them from appreciably entering the measuring section S. Microwaves scattered into the tube system 1 with frequencies close to or equal to the frequency of the waveguide fundamental wave, and with a polarization that deviates significantly from the polarization of the microwaves coupled via the transmitting antenna 2, and/or microwaves modified by reflection, diffraction and superposition outside of the section F of the tube system 1 with frequencies close to or equal to the frequency of the waveguide fundamental wave and with a polarization that differs significantly from the polarization of the microwaves coupled via the transmitting antenna 3 are shorted or at least significantly attenuated by the auxiliary field rods 6, 7 and 6', 7', so that they cannot enter the measuring section S at all or only after significant attenuation, so that they do not distort the measurement results. Frequencies near the frequency of the waveguide fundamental wave are frequencies between 0.95 to 1.05 times the frequency of the waveguide fundamental.

Figure 4:
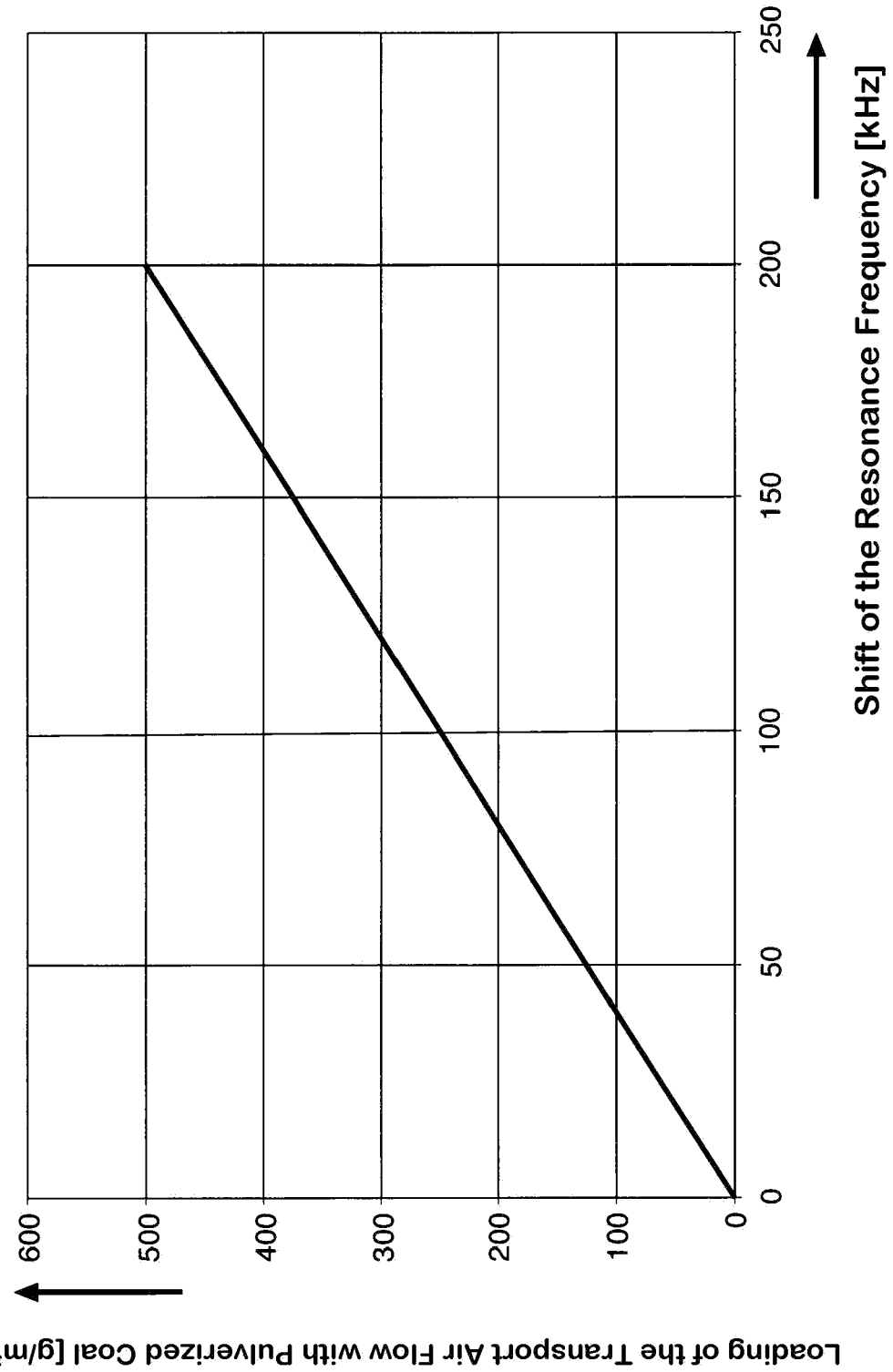

FIG. 4 shows for the aforedescribed arrangement the loading of the transport air flow in the tube system 1 with pulverized coal as a function of the change in the resonance frequency of the resonator formed of the field rods 4, 4' and the straight electrically conductive section F of the tube or channel system 1 with constant cross-sectional geometry due to the loading of the transport air flow in the resonator with pulverized coal particles. The frequencies of the microwaves coupled via the transmitting antenna 2 are between 340 MHz and 352 MHz. Essentially, the loading of the transport air flow with pulverized coal is inversely proportional to the square of the change in the resonant frequency. This relationship is quasi linear in the range of variation of the resonance frequency shown in FIG. 4.

In another example, the straight electrically conductive section F of the tube system 1 has an approximately circular cross-sectional area with a diameter D=400 mm. The frequency of the waveguide fundamental wave of this straight electrically conductive section F of the tube system 1 is approximately 439 MHz, which corresponds to a wavelength of 680 mm. The distance S between the transmitting and the receiving antenna 2, 3, i.e. the length of the measuring section S is 150 mm. Based on the wavelength of the waveguide fundamental wave of 680 mm of the straight electrically conductive section of the tube or channel system with constant cross-sectional geometry, the field rods 4, 4' have a mutual distance E of 690 mm from each other and an equal distance from the transmitting and receiving antenna. 2, 3, and are aligned in the longitudinal direction of the section F of the tube system 1 with respect to the transmitting or receiving antenna 2, 3 and with respect to one another, with the distance A, B of 270 mm. They each extend within a cross-sectional area 5, 5' of the section F of the tube system 1 from the wall of the tube system 1 beyond the center of the cross-sectional area. The field rods 4, 4' have a length of 280 mm. The auxiliary field rods 6, 7 and 6', 7' are associated with the field rods 4, 4', as shown in FIGS. 1 to 3. The distance G between the auxiliary field rods 6, 7 and 6', 7' to the respective field rods is 8 mm and 16 mm, respectively.

LIST OF REFERENCE SYMBOLS

1 tube system
2 transmitting antenna
3 receiving antenna
4 field rod
4' field rod
5 cross-sectional area
5' cross-sectional area
6 auxiliary field rod
6' auxiliary field rod
7 auxiliary field rod
7' auxiliary field rod
A distance between transmitting antenna and field rod
B distance between receiving antenna and field rod
E distance between the field rods
F straight electrically conductive section of the tube system
G distance between field rod and associated auxiliary field rod
S measuring section
α angle

The invention claimed is:

1. A microwave measuring arrangement for determining the loading of a two-phase flow comprising
a gaseous carrier medium in a tube or channel system (1) with small and very small solid and/or liquid particles,
a transmitting antenna (2) for coupling linearly polarized microwaves, and a receiving antenna (3), arranged with a mutual distance from one another in the longitudinal direction of a straight electrically conductive section (F) of the tube or channel system (1) having a constant cross-sectional geometry and forming a measuring section (S) and carrying the two-phase flow, and
an electrically conductive field rod (4, 4'), arranged in the longitudinal direction of the straight electrically conductive section (F) of the tube or channel system (1) with constant cross-sectional geometry before and after the measuring section (S) and aligned therewith, and extending within a respective cross-sectional area (5, 5') of the straight electrically conductive section (F) of the tube or channel system (1) with constant cross-sectional geometry into the interior of the straight electrically conductive section (F) of the tube or channel system (1), so that the field rods (4, 4') and the straight electrically conductive section (F) of the tube or channel system (1) with constant cross-sectional geometry between the field rods (4, 4') act as a resonator for coupled linearly polarized microwaves,
wherein two electrically conductive auxiliary field rods (6, 7 or 6', 7'), associated with each field rod (4, 4') and extend radially from the inner wall of the straight electrically conductive section (F) of the tube or channel system (1), project at least to the center of the cross-sectional area and aligned with respect to each other in the longitudinal direction of the straight electrically conductive section (F) of the tube or channel system (1), are arranged in the cross-sectional area (5, 5') in which the field rod (4, 4') extends or in a cross-sectional area that is adjacent to, with a small distance (G) from, the respective cross-sectional area (5, 5') of the straight electrically conductive section (F) of the tube or channel system (1) with a constant cross-sectional geometry, at an angle with respect to the field rod (4, 4') of α=+45°±10° and/or α=45°±10° and/or α=+135°±10° and/or α=135°±10°, wherein the two auxiliary field rods (6, 7 or 6', 7') associated with a field rod (4, 4') enclose an angle of 90°±20° and wherein the auxiliary field rods (6, 7 and 6', 7') are connected electrically conductive with the straight electrically conductive section (F) of the tube or channel system (1).

2. The microwave measuring arrangement according to claim 1,
wherein the field rods (4, 4') are arranged before and after the measuring section (S) and spaced from the transmitting or receiving antenna (2, 3) by at least one tenth of the wavelength of the waveguide fundamental wave, and spaced from each other by a distance of between approximately one time the wavelength and approximately twice the wavelength of the waveguide fundamental wave of the straight electrically conductive section (F) of the tube or channel system (1) with constant cross-sectional geometry, approximately in the plane of polarization of the coupled microwaves and in the longitudinal direction of the straight electrically conductive section (F) of the tube or channel system (1) with constant cross-sectional geometry, in alignment with the transmitting and receiving antenna (2, 3), projecting radially from the inner wall of the straight electrically conductive section (F) of the tube or channel system (1) at least to the center of the cross-sectional area (5, 5'), and connected electrically conductive with the straight electrically conductive section (F) of the tube or channel system (1).

3. The microwave measuring arrangement according to claim 1, wherein the distance (G) of the two auxiliary field rods (6, 7 or 6', 7') associated with a field rod (4, 4') in the longitudinal direction of the straight electrically conductive section of the tube or channel system (1) with constant cross-sectional geometry is at most one tenth of the wavelength of the waveguide fundamental wave of the straight electrically conductive section (F) of the tube or channel system (1) with constant cross-sectional geometry.

4. The microwave measuring arrangement according to claim 1, wherein the auxiliary field rods (6, 7, 6', 7') span at least half of the cross-sectional area of the straight electrically conductive section (F) of the tube or channel system (1) with constant cross-sectional geometry, thus crossing the center of the cross-sectional area.

5. The microwave measuring arrangement according to claim 1, wherein the auxiliary field rods (6, 7, 6', 7') span more than two thirds of the cross-sectional area of the straight electrically conductive section (F) of the tube or channel system (1) with constant cross-sectional geometry, thus crossing the center of the cross-sectional area.

6. The microwave measuring arrangement according to claim 1, wherein the length of the auxiliary field rods (6, 7 or 6', 7') corresponds to the length of the field rods (4, 4').

* * * * *

UNITED STATES PATENT AND TRADEMARK OFFICE
CERTIFICATE OF CORRECTION

PATENT NO. : 10,697,813 B2
APPLICATION NO. : 16/346629
DATED : June 30, 2020
INVENTOR(S) : Conrads et al.

Page 1 of 1

It is certified that error appears in the above-identified patent and that said Letters Patent is hereby corrected as shown below:

On the Title Page

Inventors item (72):
Delete the suffix "I" in the inventor's name --Christian, Dippner--.

Signed and Sealed this
Eighth Day of September, 2020

Andrei Iancu
*Director of the United States Patent and Trademark Office*